US007568150B2

(12) United States Patent
Gupta

(10) Patent No.: US 7,568,150 B2
(45) Date of Patent: Jul. 28, 2009

(54) APPARATUS AND METHOD OF HIGHLIGHTING CATEGORIZED WEB PAGES ON A WEB SERVER

(75) Inventor: Bhupesh Gupta, Sadabad Gate Hathras (IN)

(73) Assignee: International Business Machines Corporation, Armonk, NY (US)

( * ) Notice: Subject to any disclaimer, the term of this patent is extended or adjusted under 35 U.S.C. 154(b) by 1530 days.

(21) Appl. No.: 09/998,392

(22) Filed: Nov. 29, 2001

(65) Prior Publication Data

US 2004/0205501 A1 Oct. 14, 2004

(51) Int. Cl.
*G06F 17/00* (2006.01)
(52) U.S. Cl. .................. 715/207; 715/206; 709/203; 707/5
(58) Field of Classification Search .............. 715/501.1, 715/500.1, 203, 206; 707/5, 102, 513; 345/763; 395/200.3; 709/218
See application file for complete search history.

(56) References Cited

U.S. PATENT DOCUMENTS

| | | | | | |
|---|---|---|---|---|---|
| 5,761,436 | A | * | 6/1998 | Nielsen | 709/245 |
| 5,960,429 | A | * | 9/1999 | Peercy et al. | 707/5 |
| 5,963,964 | A | * | 10/1999 | Nielsen | 715/501.1 |
| 5,983,244 | A | * | 11/1999 | Nation | 715/501.1 |
| 6,032,162 | A | * | 2/2000 | Burke | 715/501.1 |
| 6,041,360 | A | * | 3/2000 | Himmel et al. | 709/245 |
| 6,278,449 | B1 | * | 8/2001 | Sugiarto et al. | 345/826 |
| 6,421,070 | B1 | * | 7/2002 | Ramos et al. | 345/763 |
| 6,546,393 | B1 | * | 4/2003 | Khan | 707/10 |
| 6,547,829 | B1 | * | 4/2003 | Meyerzon et al. | 715/501.1 |
| 6,631,496 | B1 | * | 10/2003 | Li et al. | 715/501.1 |
| 6,725,227 | B1 | * | 4/2004 | Li | 707/102 |
| 7,031,961 | B2 | * | 4/2006 | Pitkow et al. | 707/4 |
| 2003/0080986 | A1 | * | 5/2003 | Baird | 345/700 |

OTHER PUBLICATIONS

William Jones, Keeping found things on the web, Nov. 5, 2001, ACM Press, pp. 119-126.*
Ching-Chi Hsu, Fan-Chen Tseng and Chun-Hung Chang, *Constructing Personal Digital Library by Multi-Search and Customized Category*, IEEE, 1998, pp. 148-155.
Vadim Katz and Wen-Syan Li, *Topic Distillation on Hierarchically Categorized Web documents*.

* cited by examiner

*Primary Examiner*—Doug Hutton
*Assistant Examiner*—Quoc A Tran
(74) *Attorney, Agent, or Firm*—Diana R. Gerhardt; Volel Emile

(57) ABSTRACT

A method, system and apparatus for highlighting Web pages on a server that the user has already bookmarked is provided. When a user accesses a server, an application program compares the URLs of all the Web pages bookmarked in the user's bookmark folder with URLs of Web pages on the server. All the Web pages on the server having a common URL with the Web pages bookmarked are then highlighted.

15 Claims, 16 Drawing Sheets

APPARATUS AND METHOD OF HIGHLIGHTING CATEGORIZED WEB PAGES ON A WEB SERVER

CROSS-REFERENCE TO RELATED APPLICATIONS

This application is related to co-pending U.S. patent application Ser. No. 09/997,915, entitled APPARATUS AND METHOD OF ORGANIZING BOOKMARKED WEB PAGES INTO CATEGORIES by the inventors herein, filed on even date herewith and assigned to the common assignee of this application.

This application is related to co-pending U.S. patent application Ser. No. 09/997,960, entitled APPARATUS AND METHOD OF LINKING SUB-FOLDERS IN A BOOKMARK FOLDER by the inventors herein, filed on even date herewith and assigned to the common assignee of this application.

This application is also related to co-pending U.S. patent application Ser. No. 09/998,391, entitled APPARATUS AND METHOD OF COMBINING BOOKMARKS IN DIFFERENT SUB-FOLDERS INTO A NEW SUB-FOLDER by the inventors herein, filed on even date herewith and assigned to the common assignee of this application.

BACKGROUND OF THE INVENTION

1. Technical Field

The present invention is directed generally to bookmark folders. More specifically, the present invention is directed to an apparatus and method of highlighting Web pages displayed on a server that are common to bookmarked Web pages in a bookmark folder.

2. Description of Related Art

As is well known by now, the World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse. Thus, a link is a very useful Internet navigational tool.

Another useful Internet navigational tool is a bookmark. A bookmark is a feature that is available in most Web browsers that allows a user to store Web addresses or URLs (Uniform Resource locators) of Web pages, that are to be later re-visited, into a folder (i.e., a bookmark folder). (A Web browser is a software application that is used to locate Web sites and display Web pages.) U.S. Pat. No. 6,037,944 issued to Himmel et al. and entitled NAMED BOOKMARK SETS as well as U.S. Pat. No. 6,208,995 B1 issued to the same inventors and entitled WEB BROWSER DOWNLOAD OF BOOKMARK SET describe how a bookmark is downloaded into a bookmark folder. The description in both patents is herein incorporated.

To bookmark a Web page, a user may have to access a server on which the Web page is stored. Often times, the user will have first accessed a Web portal such as Yahoo. Web portals generally arrange Web pages into categories. When the user accesses a Web portal, it would be greatly convenient if the user is alerted of the Web pages that the user has already bookmarked as the user may then not re-bookmark the Web page.

What is needed, therefore, is a method and apparatus for highlighting Web pages on a Web portal or server that the user has already bookmarked.

SUMMARY OF THE INVENTION

The present invention provides a method and apparatus for highlighting Web pages on a server that the user has already bookmarked. When a user accesses a server, an application program compares the URLs of all the Web pages bookmarked in the user's bookmark folder with URLs of Web pages on the server. All the Web pages on the server having a common URL with the Web pages bookmarked are then highlighted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
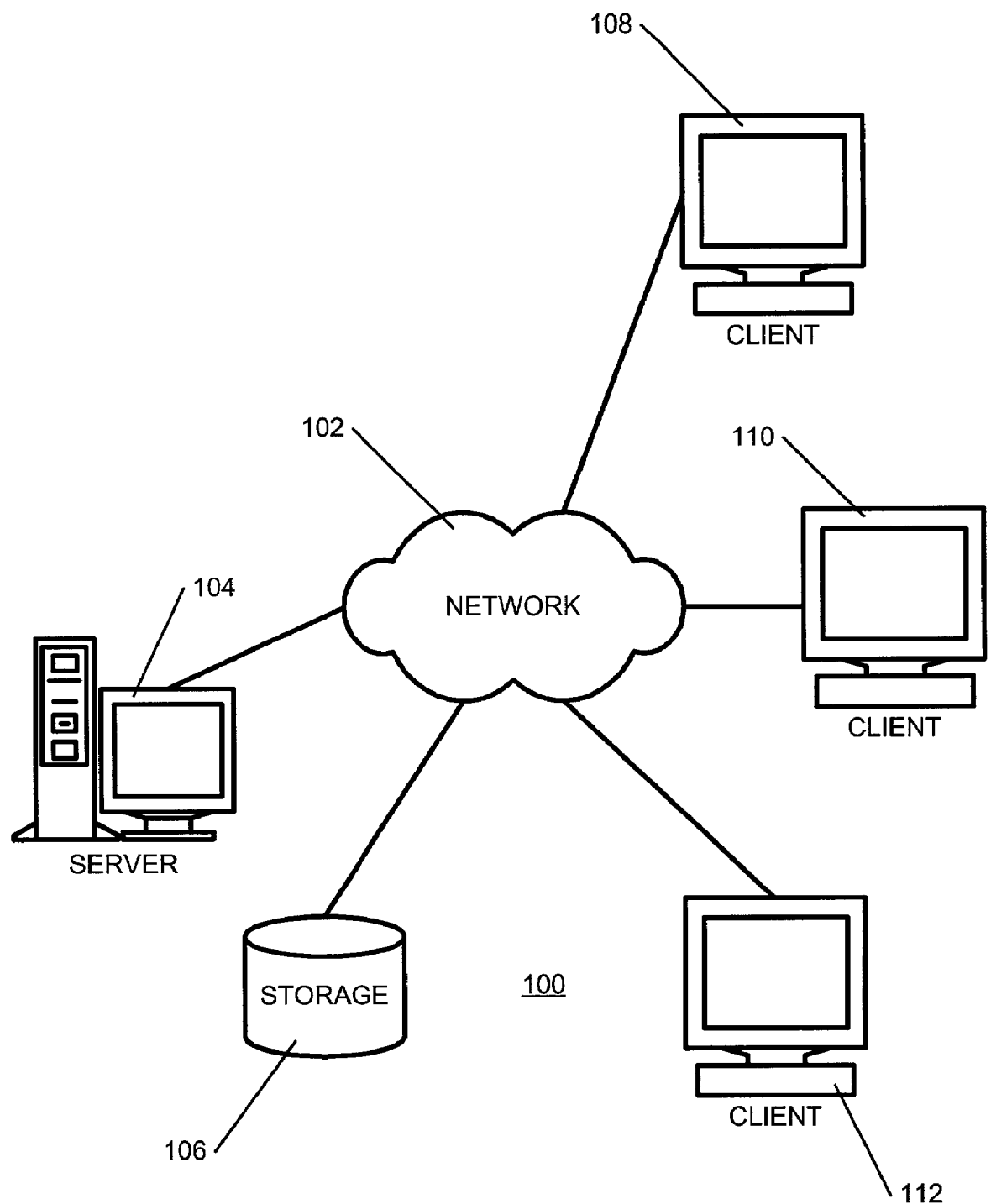
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
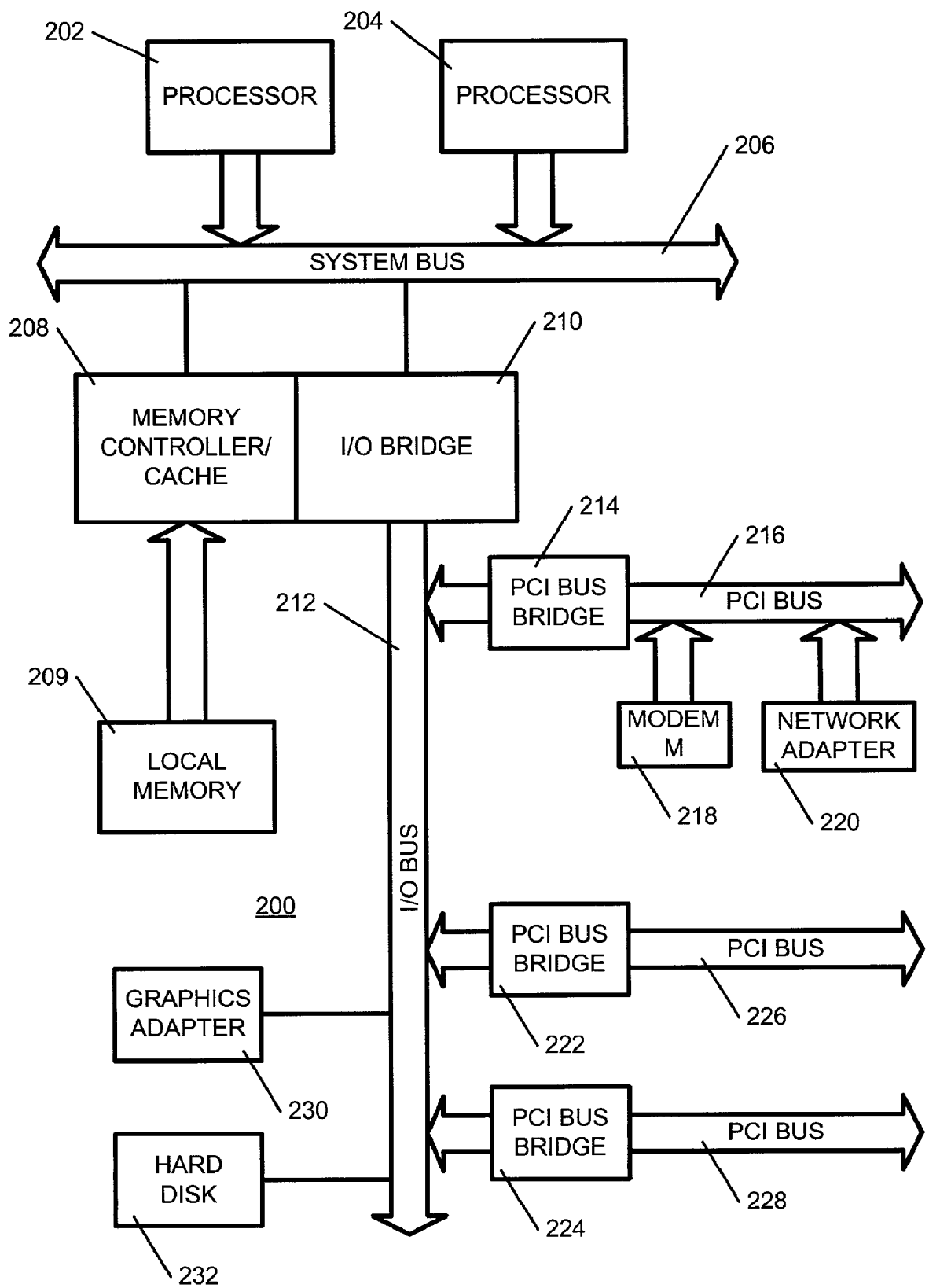
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
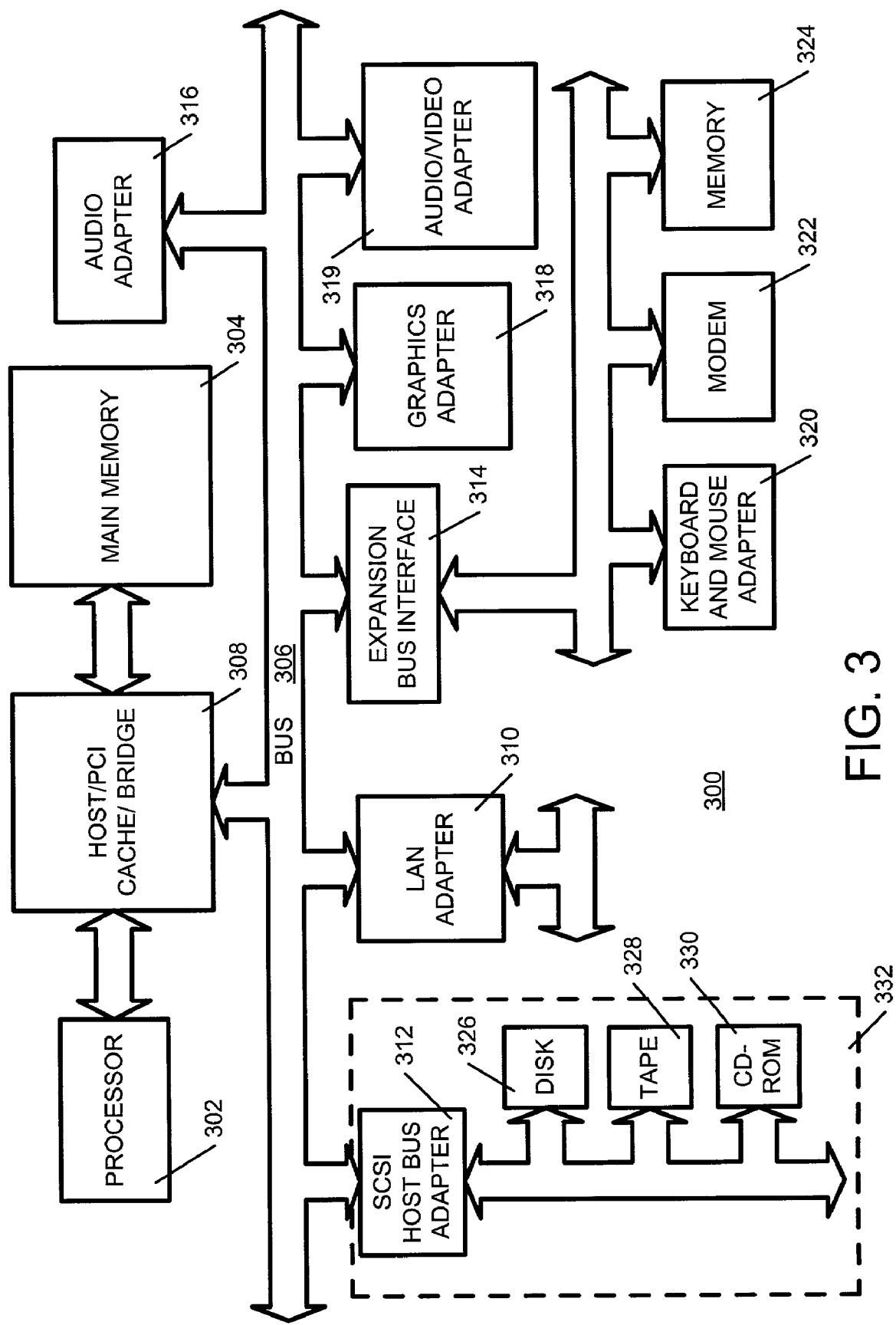
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of automatically assigning titles of sub-folders into which Web pages may be stored. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, RAM, etc.) used by a computer system.

Figure 4:
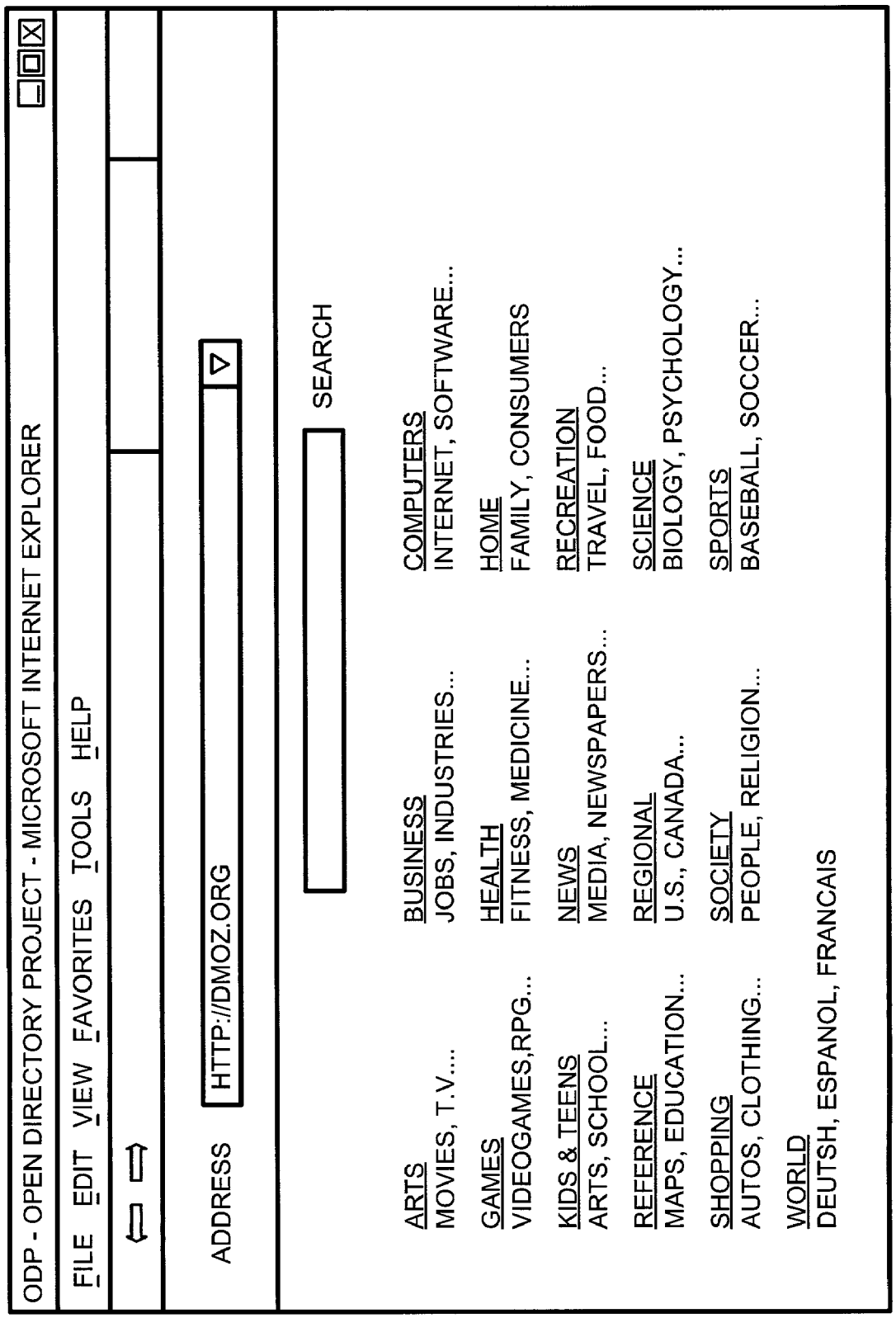
FIG. 4 is a display of different categories on a Web portal.

There is a number or Web portals available today. A Web portal is a Web site that provides a broad array of resources and services such as email, forums, search engines, on-line shopping malls as well as access to the Internet. These Web portals often have a search engine also. Some of these Web portals are Yahoo (short for Yet Another Hierarchical Officious Oracle), Metacrawler, AltaVista, Excite, Google, Looksmart, Webcrawler, ODP (Open Directory Project). Most of the Web portals provide a directory that contains categorized Web pages. For example, when a user accesses the Open Directory Project Web site, FIG. 4 is displayed. Just about every word displayed in FIG. 4 is a category. As shown in the figure, there are categories (i.e., sub-categories) within categories. For instance, "Movies" is a sub-category within the "Arts" category. Note that, not all the categories listed on the site are shown in FIG. 4.

The present invention uses the category classification in a Web portal to arrange bookmarked Web pages in the bookmark folder. When a user selects a link or Web page to bookmark, a client program on the user's machine may request from a server program of a default Web portal the category in which the link or Web page is located. Or, the client program may request the categories in batch after a pre-determined time interval. When the category is received, a sub-folder is created and the category is used as the name of the sub-folder if it does not already exist. The bookmarked Web page is then stored into the sub-folder.

In the event that the link or Web page is not found in any of the categories of the default Web portal, the algorithm on the user's machine may so notify the Web portal administrator. When the Web portal administrator classifies the Web page into a category, a message may be sent to the user's machine with the category in which the Web page is now located. At that point, a sub-folder for the category may be created on the user's machine into which the bookmarked Web page may then migrate.

As usual, a user may change the name or title of a category or folder at will. Likewise, a user may merge one sub-folder/category into another and create new sub-folders/categories.

Additionally, a user may link one category/sub-folder to another. For example, suppose a user links sub-folder "B" to "A". Then, when a user accesses sub-folder "A", all the bookmarks in sub-folder "A" as well as those in sub-folder "B" will be displayed. If however, the user accesses sub-folder "B", only the bookmarks in sub-folder "B" will be displayed.

A user may further create a new category by simply merging two or more categories or merging two or more categories and filtering the bookmarked Web pages with a keyword or phrase. For instance, suppose a user wants to create a category/sub-folder named "Austin" in which bookmarks of other folders may be stored. If the user uses "Austin" as a keyword to search the merged bookmark sub-folders, the invention will parse all the bookmarked Web pages in the merged sub-folders for that reference. Any bookmarked Web pages with the Austin reference will be duplicated and stored into the category/sub-folder and Austin may be used as the name of the sub-folder. Note that bookmarks may be filtered out instead of being filtered in as in the example above. For instance, instead of bookmarking all the Web pages that contain the Austin reference in the sub-folder, the algorithm may be designed to bookmark all the references that do not contain the Austin reference.

In addition, Boolean searches may also be performed. For instance, a user may search the sub-folders for both Austin and IBM. Furthermore, the user may decide to bookmark Web pages that contain only the IBM reference since the Web pages with the Austin reference will have already been in the Austin subfolder. Thus, different search algorithms may be used.

Note also that in the examples above, the entire bookmark folder may be searched instead of a few sub-folders.

Moreover, the user may set options not to display an empty category/sub-folder. Additionally, the user may set the options not to display contents of a category/sub-folder with less than N bookmarked pages in the sub-folder but rather to display the content in the parent directory instead. For example, suppose there is one bookmark in sub-folder CRAFTS and sub-folder CRAFTS is under parent directory ARTS, if N is equal to 3, the bookmark may be shown under the ARTS directory. In that case, the user need not go down to the sub-folder to access the Web page bookmarked in the CRAFTS directory but may do so from the parent directory. Note that above N may be either a user-defined integer or a default integer.

Figure 5:
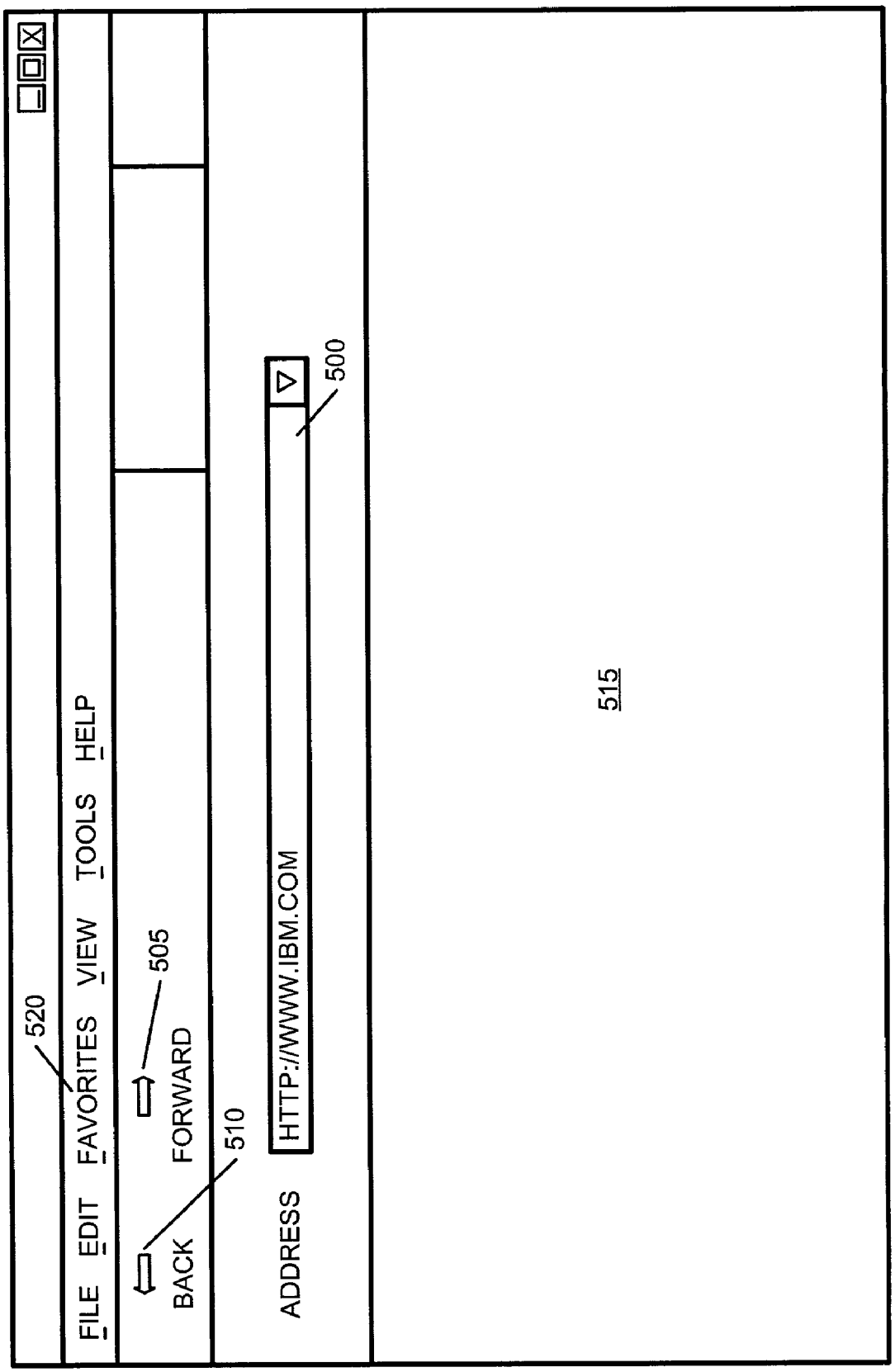
FIG. 5 is a representative graphical user interface (GUI) of a Web browser.
Figure 6:
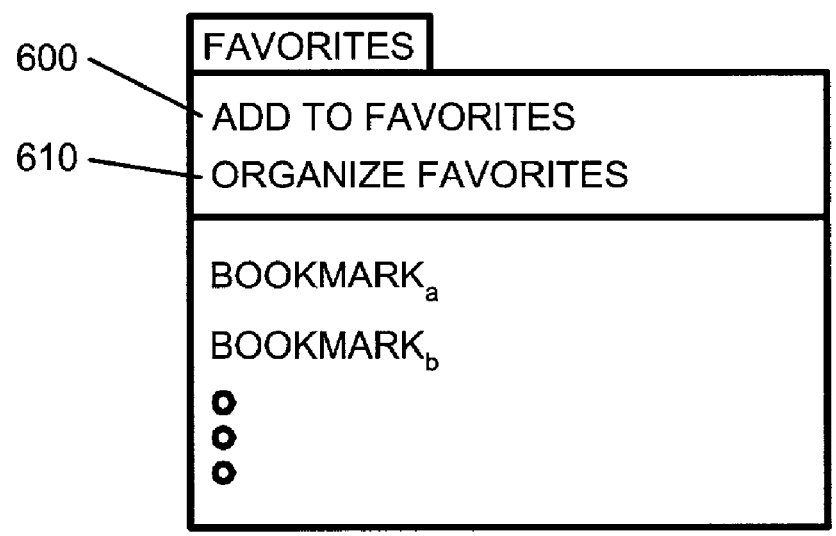
FIG. 6 is a typical bookmark folder.
Figure 7:
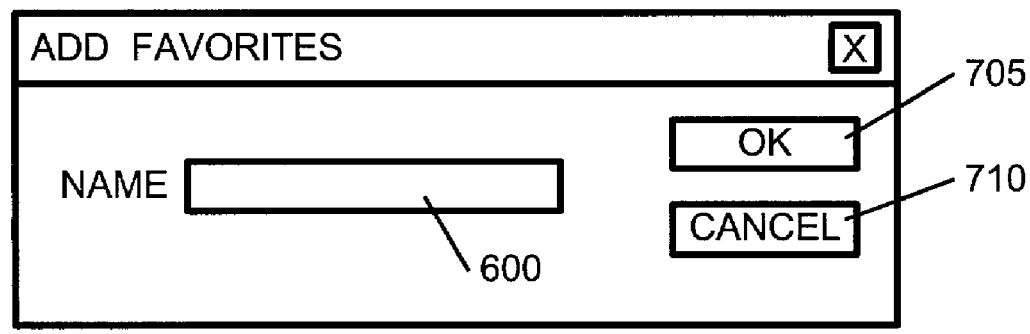
FIG. 7 depicts a GUI for bookmarking a Web page.

FIG. 5 is a representative graphical user interface (GUI) of a Web browser. Not all items in the GUI are shown and only the items of importance to the invention are given a reference numeral. When a Web browser is activated and a Web page is accessed, the content of the page is displayed in area 515, the address or URL of the page is displayed in address box 500. To bookmark a page, the bookmark folder has to be opened. In Netscape Navigator, a user has to click once on a bookmark icon and in Internet Explorer the user has to click once on a Favorites icon to open the bookmark folder. In this particular example, Internet Explorer is used. However, it should be understood that any other Web browser having the bookmark feature may be used with the invention. In any case, when the bookmark folder is opened, FIG. 6 is displayed. When a user asserts "add to Favorites", FIG. 7 is displayed. In name box 700 is displayed a default name associated with the URL. If the user so wants, the user may replace the default name by another name of the user's liking. When done, ok button 705 can be asserted to bookmark the page, or cancel button 710 can be asserted to close FIG. 7 without bookmarking the page.

Figure 8:
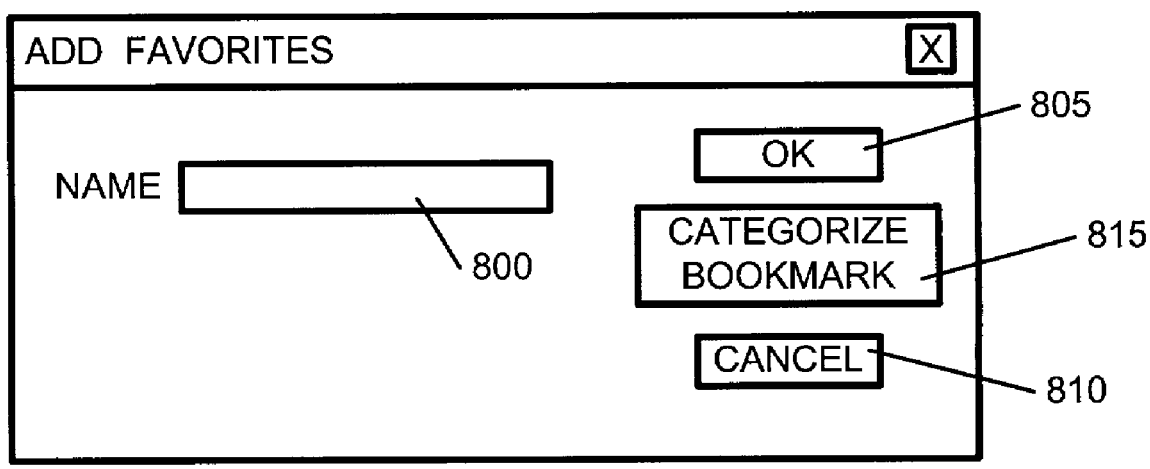
FIG. 8 depicts a GUI for bookmarking a Web page used by the present invention.

FIG. 8 is a depiction of FIG. 7 with an added function. The added function is a categorize bookmark function that can be accessed using categorize bookmark button 815. Name box 800, OK button 805 and cancel button 810 have the same purpose as name box 700, OK button 705 and cancel button 710 in FIG. 7. When the user asserts categorize bookmark button 815, a search will be sent to the Web portals to determine in which category the Web page to be bookmarked is located. When the category is returned, another check may again be done to determine whether there is already a sub-folder by that name. If so, the Web page will be stored in the sub-folder. If not, a sub-folder will be created and the category will be used as the name of the sub-folder. Then the Web page will be stored within the sub-folder.

Figure 9:
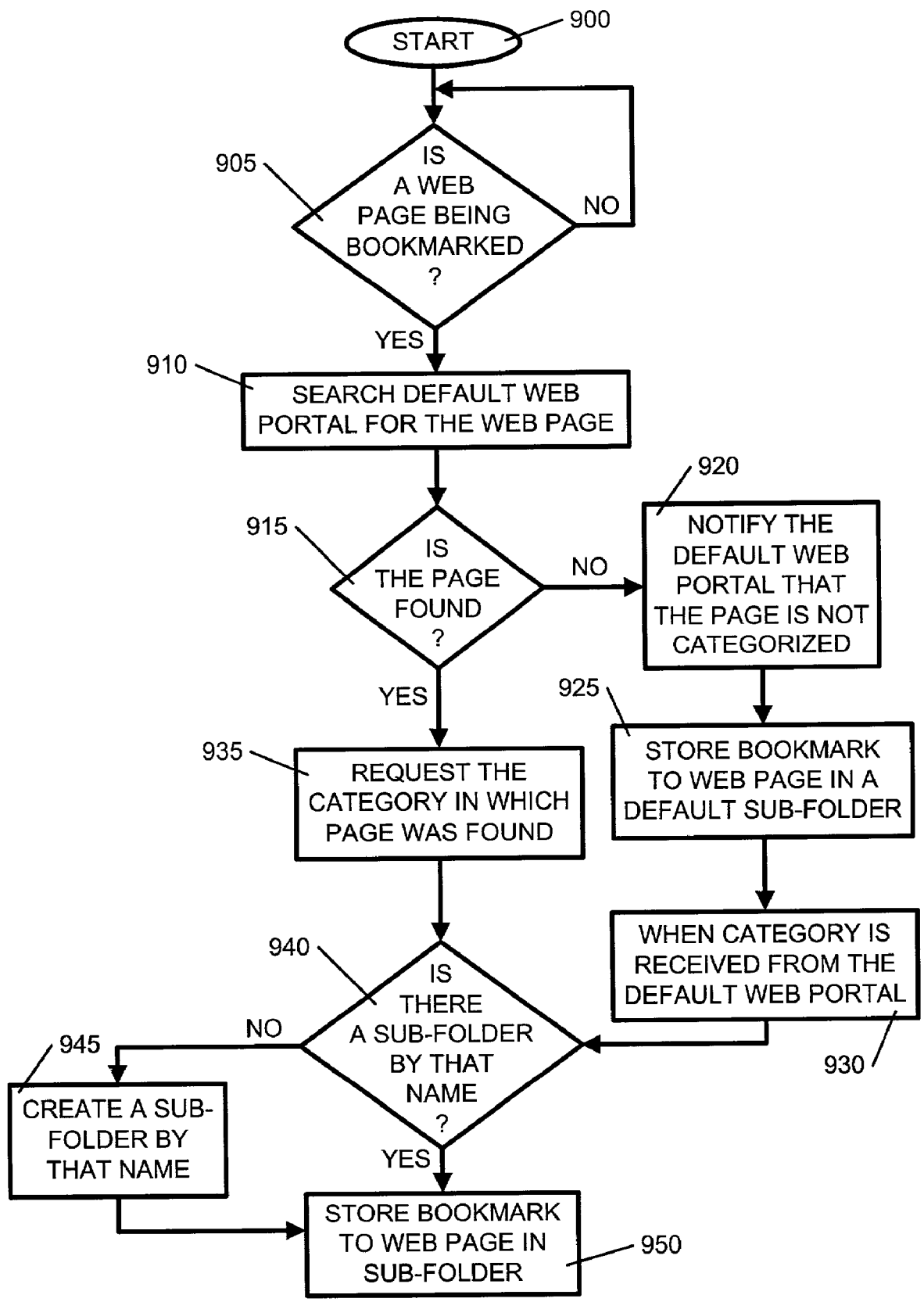
FIG. 9 is a flow chart of a process that may be used to request categories in Web portals for use with the invention.

FIG. 9 is a flow chart of a process that may be used to request categories in Web portals for use with the invention. The invention starts when the Web browser is activated (step 900). A check will continuously be made to determine whether a Web page is being bookmarked. If so, a search for that Web page will be made on the default Web portal (steps 905, 910 and 915). If the Web page is found, depending on the implementation, the client computer may request that the category in which the Web page is found be provided or the server or Web portal may automatically convey the category to the client system (step 935). Then, a check will be made on the client system to determine whether there exists a sub-folder having the name of the category. If so, the bookmark for that Web page will be stored in the existing sub-folder. If not a sub-folder by that name may be created in which the bookmark may be stored (steps 935, 940, 945 and 950).

If the Web page is not found in the default Web portal, the default Web portal may do a search on other Web portals for the Web page. If the Web page is found on one of the servers searched, the default Web portal may use a cross-reference map to properly assign the Web page into one of its own categories. The category into which the Web page is assigned may then be downloaded to the client that requested the search. If the Web page is not found in any category of the Web portals searched, a note may be left to the administrator of the default Web portal to assign the Web page into a category.

In that case, the Web page will be stored into a default sub-folder. When the administrator has categorized the Web page, a note may then be sent to the client system with the category in which the Web page is now located. At that time, the client may search the bookmark folder to determine whether there already exists a subfolder by that name. If so, the bookmark will be moved into the sub-folder. If not, one will be created to store the bookmark (steps 920, 925, 930, 940, 945 and 950). Note that to determine which bookmark from the default folder to use, the server may download along with the category the URL of the Web page. The downloaded URL may then be compared with the URLs of the Web pages bookmarked in the default sub-folder. In any case, when the bookmark is put into the category, the user may be notified.

Note also that when a user is bookmarking a Web page, a search may also be performed. Using the example of the Austin filtration described above, when the user decides to bookmark a Web page, a search for Austin may be performed. If the Web page contains a reference to Austin, the Web page may be stored not only in the appropriate category but in the Austin sub-folder as well.

Figure 10:
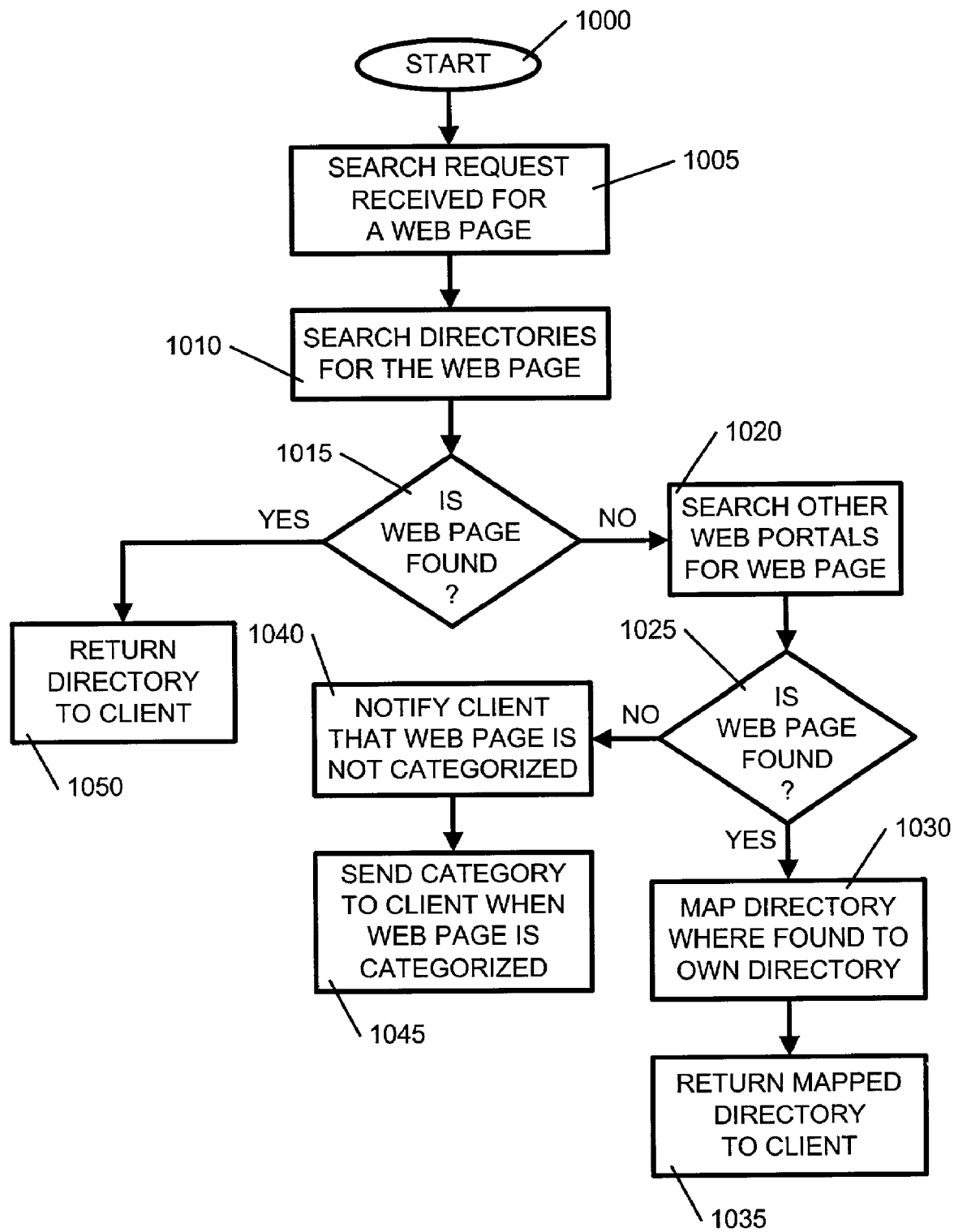
FIG. 10 is a flow chart of a process that may reside on a Web portal to facilitate the invention.

FIG. 10 is a flow chart of a process that may reside on a Web portal to facilitate the invention. Whenever the server on which the program is installed is running the process is also running (step 1000). When the server receives a search for a Web page, it searches its directories for the Web page. If the Web page is not found, it may do a search on other Web portals for the Web page. If the Web page is found on one of the Web portals, the category in which the Web page is located may be mapped to a category of the default Web portal. The Web portal may store the Web page in the category that is mapped to the category in which the Web page was found and the default Web portal's category may then be downloaded to the client (steps 1000, 1005, 1010, 1015, 1020, 1025, 1030 and 1035).

If the Web page is not found in any categories of the Web portals searched, the administrator may be notified that the Web page needs to be categorized. It will then send a note to the computer requesting the search that the Web page has not been categorized (steps 1005, 1010, 1015, 1020, 1025, 1040 and 1045). If the Web page is found in a category, the category will be returned to the computer system that has requested it (steps 1015 and 1050).

Note that depending on the implementation, the search may stop as soon as the Web page is found in a category or may continue. If the search continues, then all the categories in which the Web page was found may be returned to the computer system. The computer system may either use the first category of the ones returned or may request that the user chooses one or all of the categories. If all the categories are used, a number of sub-folders equals to the number of categories returned will be created into which the bookmark to the Web page is to be stored. Each category will be used as a name to one of the sub-folders.

Figure 11:
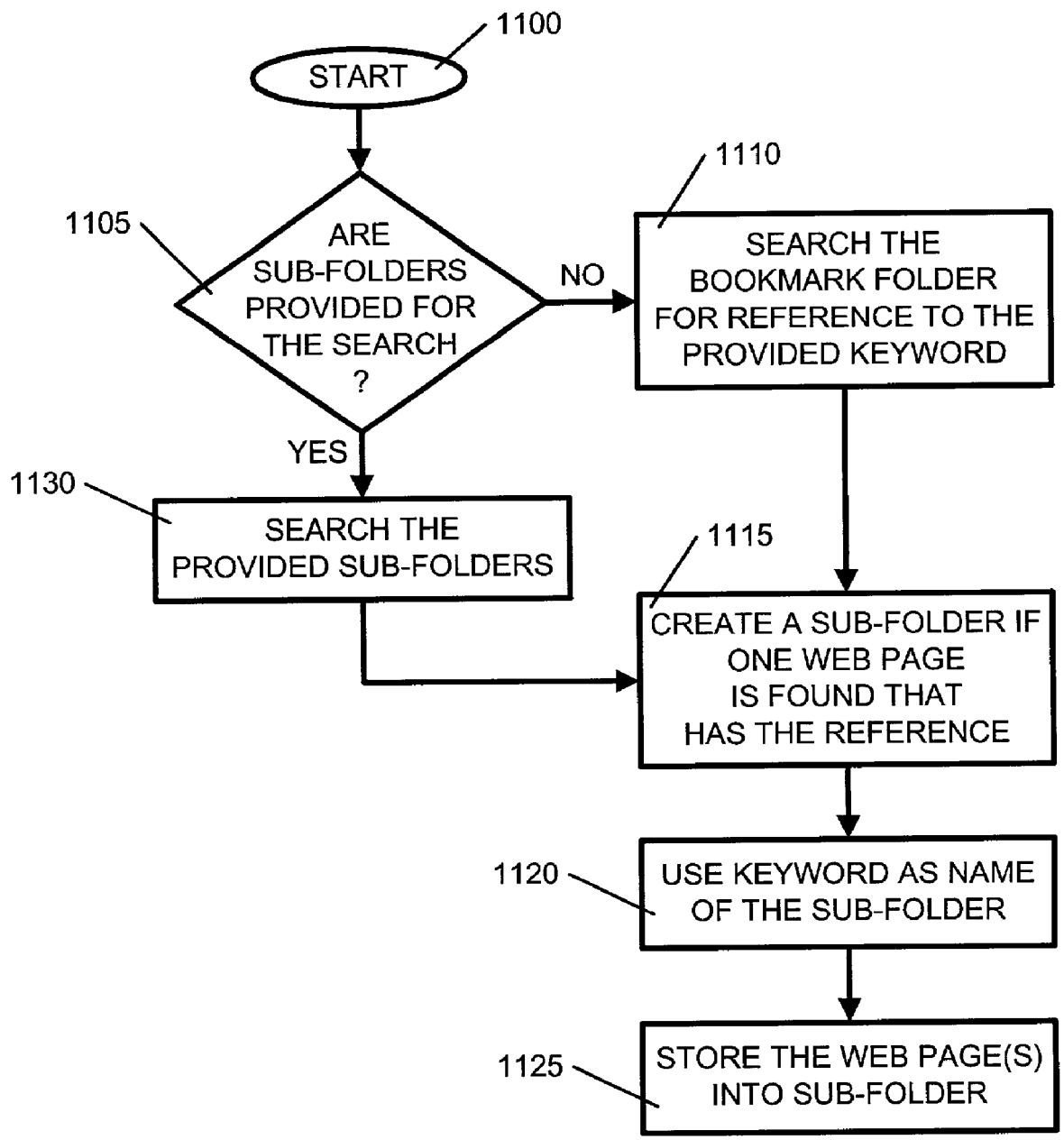
FIG. 11 is a flow diagram of a process that may be used to filter in or out bookmarked Web pages into a sub-folder.

FIG. 11 is a flow diagram of a process that may be used to filter in or out bookmarked Web pages into a sub-folder. The process starts when a search request is initiated on the user's computer system to search sub-folders that contain Web pages for a provided keyword or phrase (step 1100). When this occurs, a check will be made to determine whether the sub-folders in which to search are provided. If they are provided, all the bookmarked Web pages in the sub-folders will be searched using the provided keyword or phrase. If sub-folders are not provided, the entire bookmark folder will be searched. After obtaining the result of the search, a sub-folder will be created and the result will be stored therein. If the search is to filter out the Web pages that contain the referenced keyword or phrase, the result will contain all the Web pages that do not contain the referenced key word or phrase. If, on the other hand, the search is to filter in the Web pages that contain the referenced keyword or phrase, the result will contain all the Web pages in which the referenced keyword or phrase was found. The keyword or phrase provided may be used as the name of the newly created sub-folder (steps 1100, 1105, 1110, 1115, 1120, 1125 and 1130).

Note that to do the search, the Web pages will have to be accessed and parsed for the keyword or phrase. All that may be done in the background (i.e., transparent to the user). Note also that a method of performing a search is not disclosed as performing searches is well known in the field.

Figure 12:
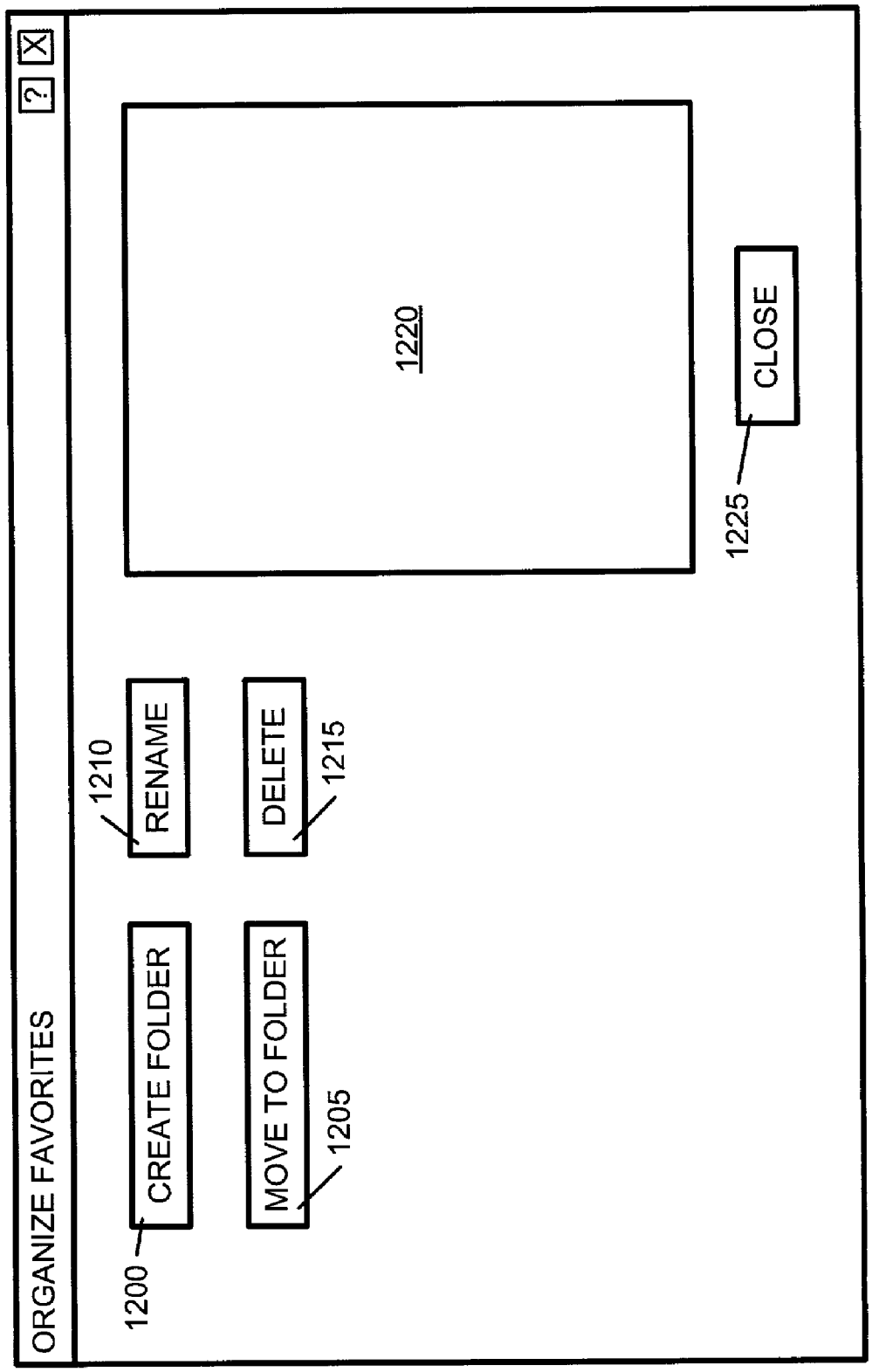
FIG. 12 is a typical GUI to organize bookmarks in a bookmark folder.

To link two or more sub-folders together, a user has to assert the organize favorites feature 610 of FIG. 6. When this feature is asserted, the GUI in FIG. 12 is displayed. Buttons 1200-1215 and 1225 are self-explanatory. All sub-folders in the bookmark folder, including bookmarks that are not in a sub-folder, are displayed in area 1220. The invention uses an added button to link two or more sub-folders together.

Linking a first sub-folder to a second subfolder is in essence copying the bookmarks in the first sub-folder into the second sub-folder. The copied bookmarks should be marked to distinguish them from the bookmarks originally stored in the second sub-folder. One way of marking the bookmarks is to put them under a title. The title may be the name of the first sub-folder. Thus, when the second sub-folder is accessed both the bookmarks originally stored in the folder and the bookmarks stored in the second folder may be displayed in a distinguishing manner.

Figure 13:
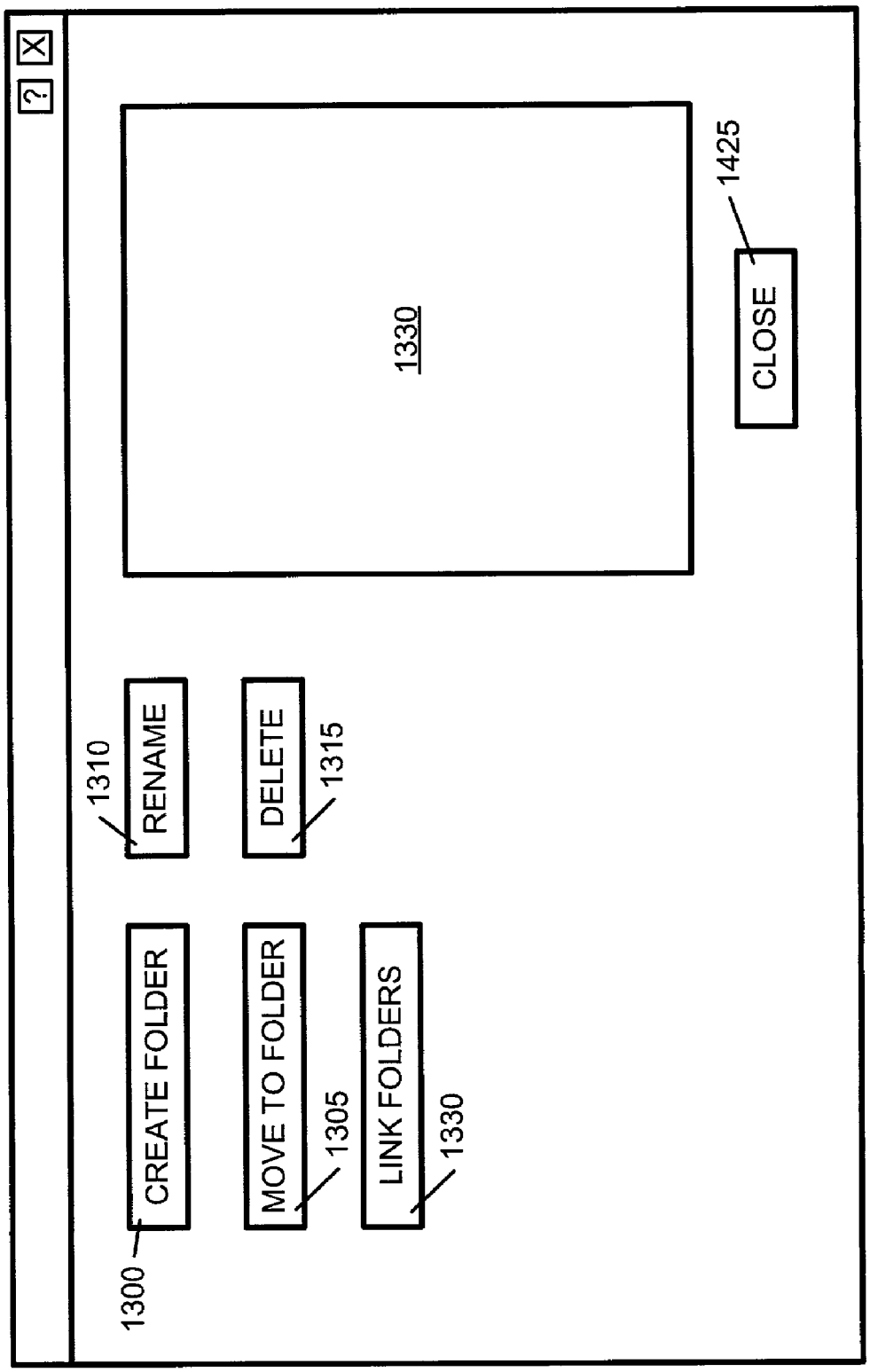
FIG. 13 is a GUI used to organize bookmarks in accordance with the invention.

FIG. 13 is an Organize Favorites GUI with the added button. Again buttons 1300-1315 and 1325 are self-explanatory. Area 1330 is used to list all the sub-folders in the bookmark folder. Link folders 1330 is used to link two or more folders together. When this button is asserted, a window may pop open to prompt the user to select which sub-folder or sub-folders that the user wants to have linked and which sub-folder the selected sub-folder or sub-folders should be linked to.

Figure 14:
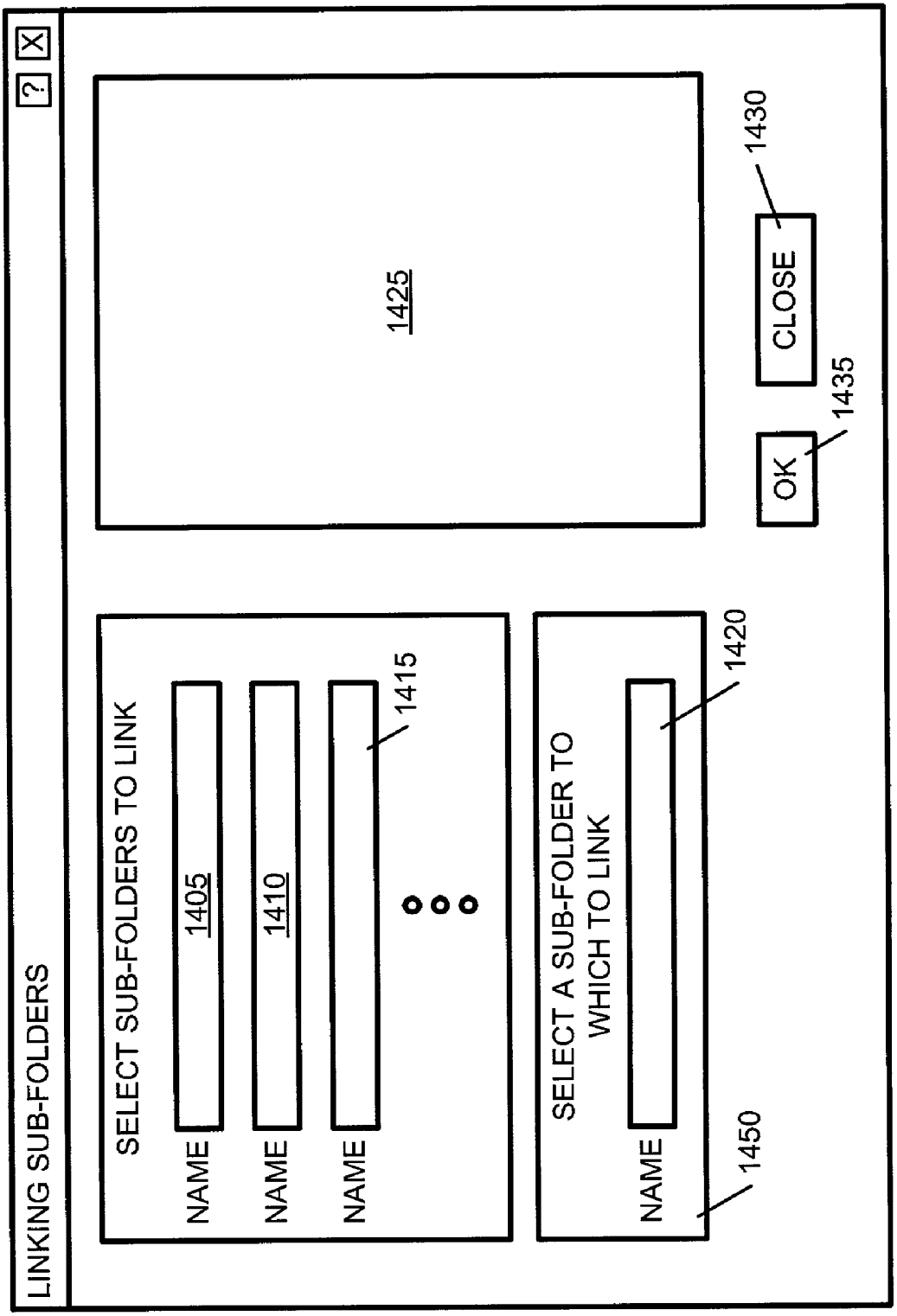
FIG. 14 depicts a GUI that may be used to link sub-folders.

FIG. 14 depicts a GUI that may be used to link the sub-folders. In box 1400, a user may choose the sub-folders that the user wants to link by entering their name in name boxes 1405-1415. In name box 1450 of box 1450, the user may enter the name of the sub-folder to which the sub-folders entered in box 1400 are to be linked. All the sub-folders in the bookmark folder, including bookmarks that are not in sub-folders, are displayed in area 1425. Consequently, the user may alternatively center the focus of the application on one of name boxes 1405-1415 and 1420 and click on a sub-folder listed in area 1425 to enter the name of the sub-folder in the name box in focus. When done the user may assert OK button 1430 and close the window by asserting close button 1430.

Figure 15:
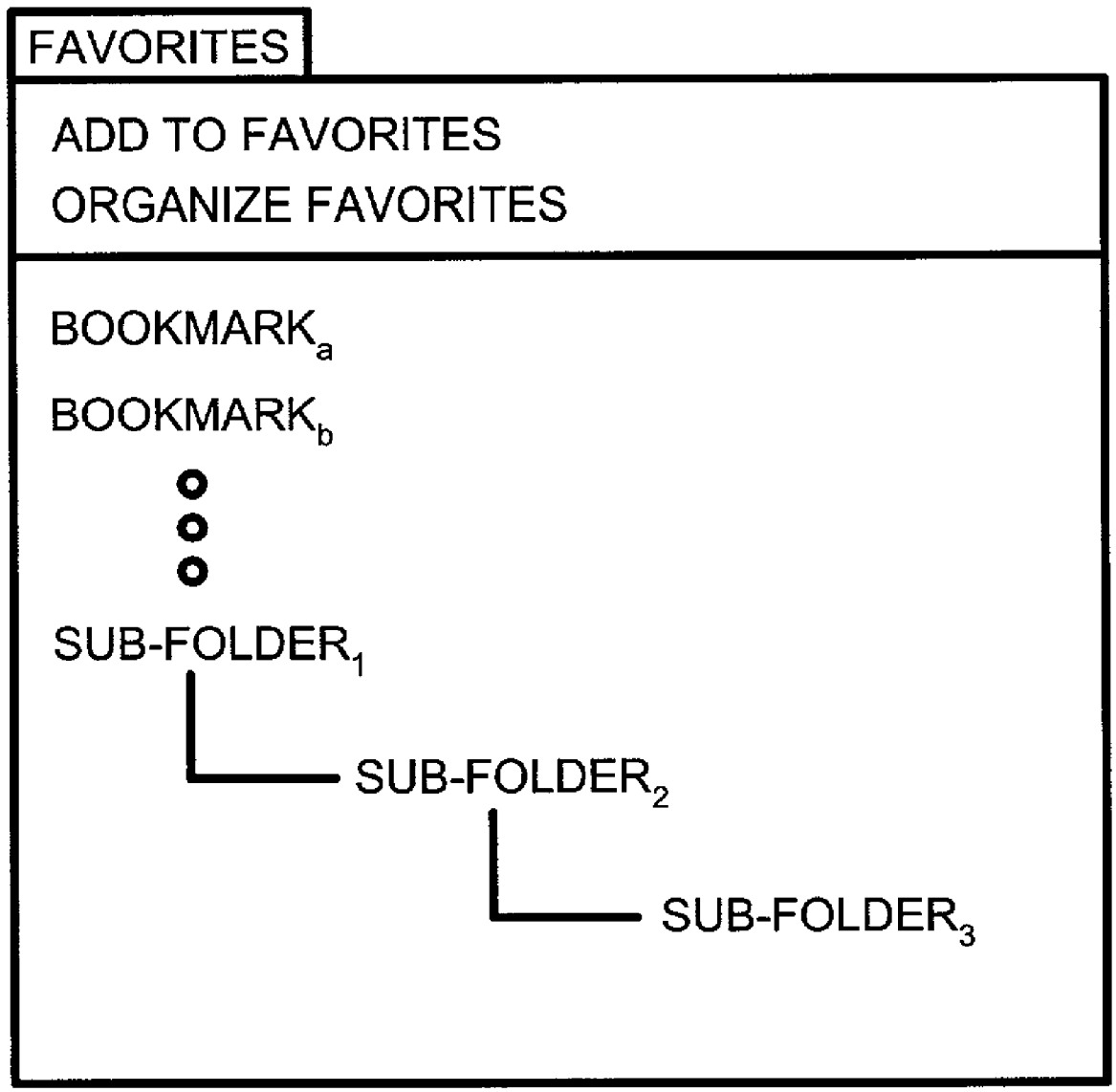
FIG. 15 depicts a bookmark folder used by the present invention.

FIG. 15 is a GUI that may be used to display the linked sub-folders. When the bookmark folder is accessed, a list of the sub-folders as well as of the bookmarks that are not in a folder is displayed. Bookmark$_a$, bookmark$_b$, ... is a list of bookmarked Web pages that is not in a sub-folder. sub-folder$_2$ and sub-folder$_3$ are linked to Sub-folder$_1$.

Figure 16:
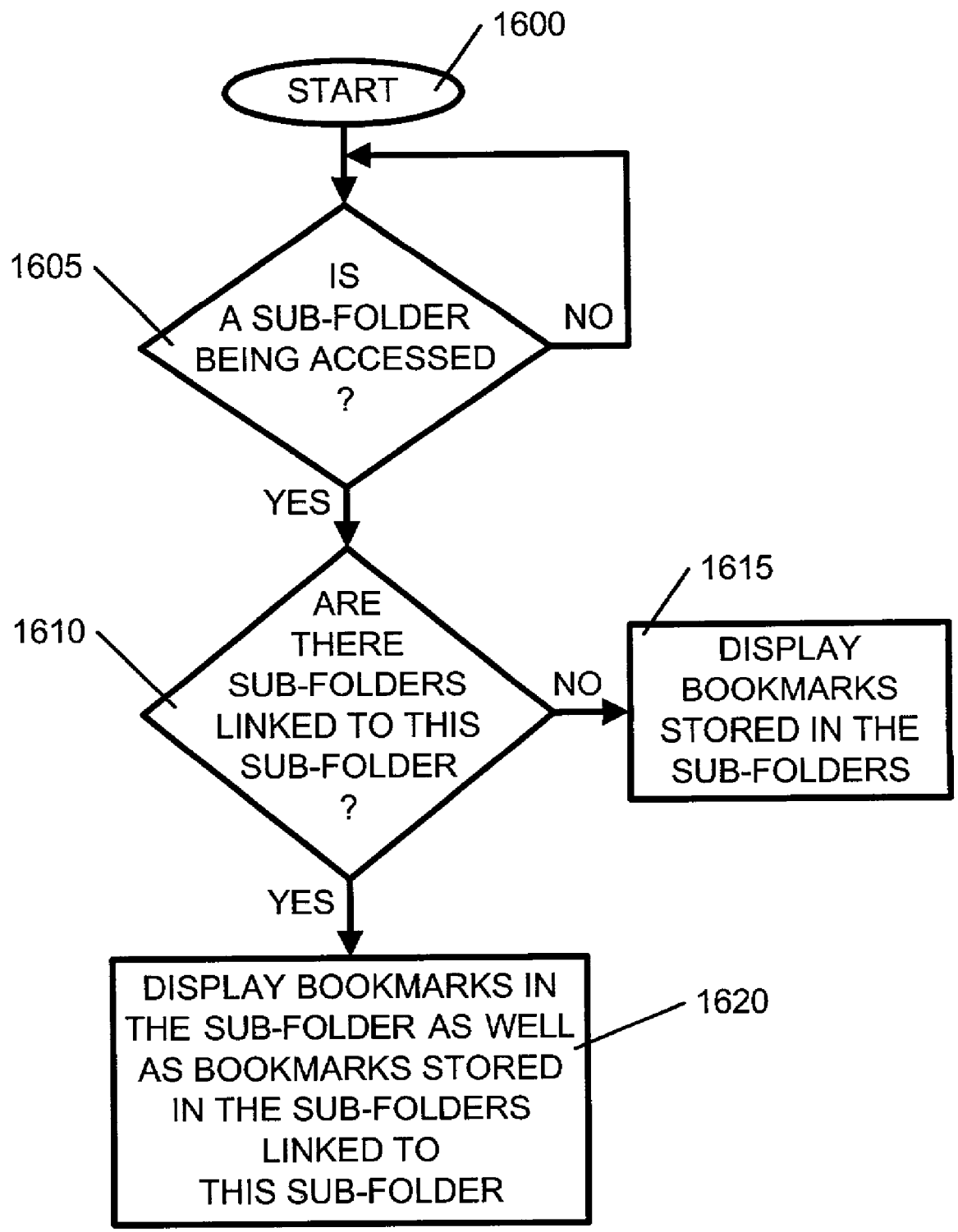
FIG. 16 is a flow chart of a process that may be used to display two or more linked sub-folders.

FIG. 16 is a flow chart of a process that may be used to display two or more linked sub-folders. The process starts as soon as the Web browser is activated (step 1600). Then a check is continuously being made to determine whether a sub-folder is being accessed. If so, another check is made to determine whether other sub-folders are linked to the sub-folder being accessed. If not, the bookmarks stored in the sub-folder being accessed are displayed (steps 1605, 1610 and 1615). If there are other sub-folders linked to the sub-folder being accessed then the bookmarks in the sub-folder being accessed as well as the bookmarks stored in the sub-folders that are linked to the sub-folder being accessed are all displayed (step 1620).

In order to distinguish the bookmarks from the different sub-folders, the bookmarks may be organized in groups based on the sub-folders in which they are stored. Each group of bookmarks may then be displayed in a different color. Alternatively, the sub-folders may be displayed as parents under which their children bookmarks may be displayed.

The present invention has been described using a client system. However, the invention will work as well on a server system. Specifically, if a user has an account with one of the Web portals that allows a user to have a bookmark folder, the user may arrange bookmarked Web pages in the bookmark folder in categorized sub-folders. In this case, all the algorithms described above will reside on the server system. In addition, the user may give others access to the bookmark folder. In this case, these other users should also have an account with the Web portal and the Web portal should also have a permission feature allowing the user to do so. As the user is bookmarking the Web page, the user may designate the other users that may also access the bookmarked Web page. Hence, only bookmarked Web pages with the permission feature enabled may be accessed.

In addition, when the user accesses the directory of the Web portal, all the Web pages that are in the user's bookmark folder may be displayed in a different color to alert the user that the Web pages in the directory have already been bookmarked.

Figure 17:
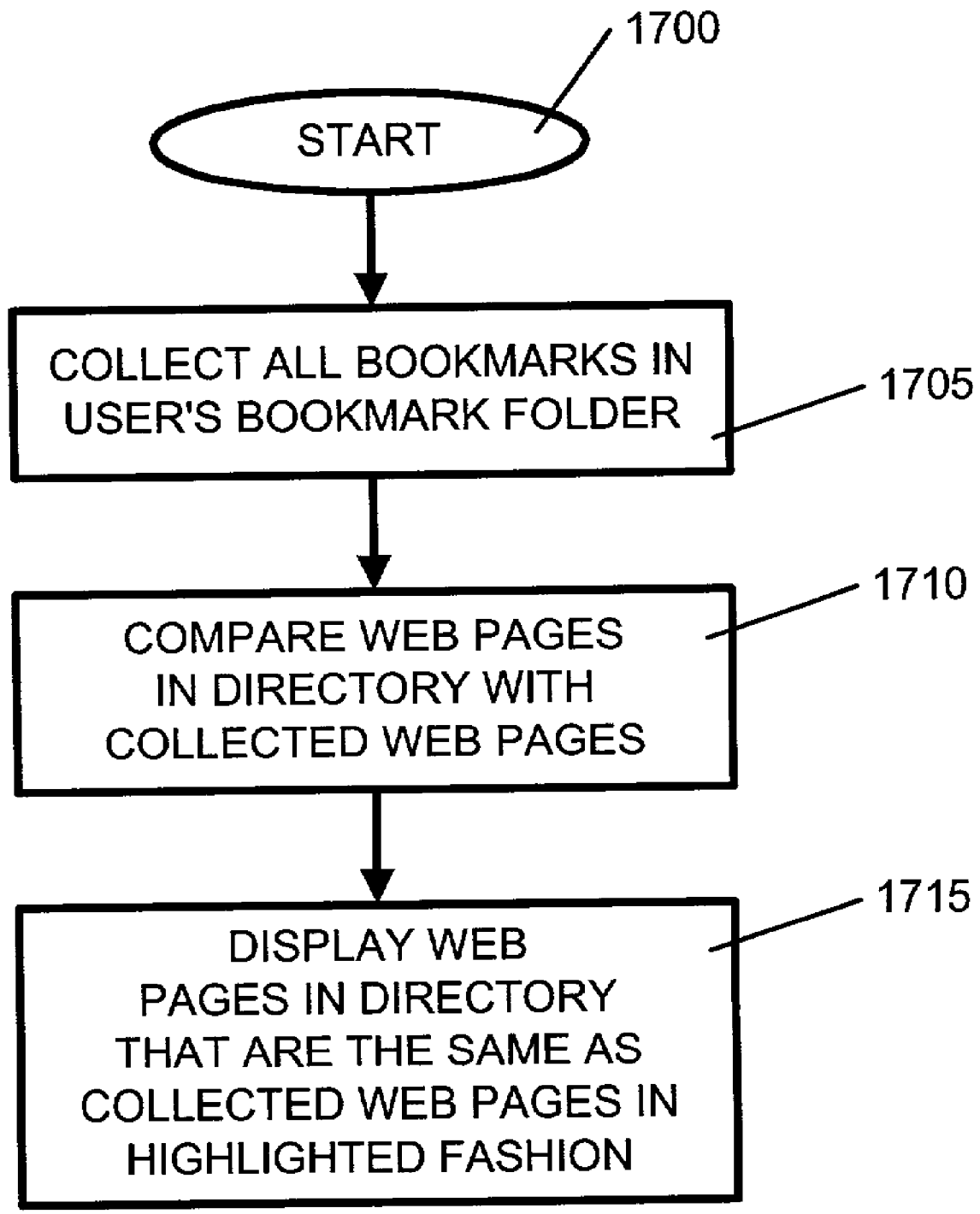
FIG. 17 is a flow chart of a process that may be used to differentiate Web pages that have already been bookmarked from those that have not been bookmarked on a server.

FIG. 17 is a flow chart of a process that may be used to differentiate Web pages that have already been bookmarked from those that have not been bookmarked on a server. The process starts as soon as the user accesses a Web portal (step 1700). The program then collects the URLs of all the bookmarked Web pages in the user's bookmark folder. Note that the bookmark folder may reside either on the client or on the server or on both the client and server. The collected URLs are compared with the URLs of the Web pages in the directory. All the Web pages in the directory having the same URLs as the URLs of the collected Web pages will be displayed in a highlighted fashion in the directory (steps 1705, 1710 and 1715). Note also that here highlighted fashion encompasses any manner of distinguishing already bookmarked Web pages from those that have not been bookmarked.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of highlighting Web pages arranged in categories on a server comprising:
   using a keyword or a phrase to search Web pages bookmarked in two or more sub-folders;
   creating a sub-folder into which all Web pages searched that contain the keyword or phrase are to be stored;
   storing bookmarks to all the Web pages that contain the keyword or phrase into the created sub-folder;
   comparing the bookmarked Web pages in the created sub-folder to the Web pages in the categories; and
   highlighting all the Web pages in the categories that are the same as the bookmarked Web pages.

2. The computer implemented method of claim 1 wherein the bookmark folder is on a client.

3. The computer implemented method of claim 1 wherein the bookmark folder is on a server.

4. A computer program product on a computer readable medium for highlighting Web pages arranged in categories on a server comprising:
   code means for using a keyword or a phrase to search Web pages bookmarked in two or more sub-folders;
   code means for creating a sub-folder into which all Web pages searched that contain the keyword or phrase are to be stored;
   code means for storing bookmarks to all the Web pages that contain the keyword or phrase into the created sub-folder;
   code means for comparing the bookmarked Web pages in the created sub-folder to the Web pages in the categories; and
   code means for highlighting all the Web pages in the categories that are the same as the bookmarked Web pages.

5. The computer program product of claim 4 wherein the bookmark folder is on a client.

6. The computer program product of claim 4 wherein the bookmark folder is on a server.

7. A computer implemented apparatus for highlighting Web pages arranged in categories on a server comprising:
   means for using a keyword or a phrase to search Web pages bookmarked in two or more sub-folders;
   means for creating a sub-folder into which all Web pages searched that contain the keyword or phrase are to be stored;
   means for storing bookmarks to all the Web pages that contain the keyword or phrase into the created sub-folder;
   means for comparing the bookmarked Web pages in the created sub-folder to the Web pages in the categories; and
   means for highlighting all the Web pages in the categories that are the same as the bookmarked Web pages.

8. The computer implemented apparatus of claim 7 wherein the bookmark folder is on a client.

9. The computer implemented apparatus of claim 7 wherein the bookmark folder is on a server.

10. A computer system for highlighting Web pages arranged in categories on a server comprising:
    at least one memory device for storing code data; and
    at least one processor for processing the code data to use a keyword or a phrase to search Web pages bookmarked in two or more sub-folders, to create a sub-folder into which all Web pages searched that contain the keyword or phrase are to be stored, to store bookmarks to all the Web pages that contain the keyword or phrase into the created sub-folder, to compare the bookmarked Web pages in the created sub-folder to the Web pages in the categories and to highlight all the Web pages in the categories that are the same as the bookmarked Web pages.

11. The computer system of claim 10 wherein the bookmark folder is on a client.

12. The computer system of claim 10 wherein the bookmark folder is on a server.

13. A computer implemented method of highlighting Web pages arranged in categories on a server comprising:
   using a keyword or a phrase to search Web pages bookmarked in two or more sub-folders;
   creating a sub-folder into which all Web pages searched that contain the keyword or phrase are to be stored;
   storing bookmarks to all the Web pages that contain the keyword or phrase into the created sub-folder
   accessing a Web page on the server on which Web pages arranged in categories are displayed;
   retrieving Uniform Resource locators (URLs) of all Web pages in the created sub-folder, the created sub-folder being stored either on a client computer system or on the server, the bookmark folder, if stored on the server, being enabled to be accessed by a plurality of users;
   comparing the URLs of the bookmarked Web pages with URLs of the Web pages in the categories; and
   highlighting all the Web pages in the categories displayed on the Web page that have the same URLs with the bookmarked Web pages.

14. A computer implemented method of indicating Web pages on a server that have already been bookmarked on a remote computer system comprising:
   using a keyword or a phrase to search Web pages bookmarked in two or more sub-folders;
   creating a sub-folder into which all Web pages searched that contain the keyword or phrase are to be stored;
   storing bookmarks to all the Web pages that contain the keyword or phrase into the created sub-folder;
   accessing a Web site on the server on which Web pages arranged in categories are displayed;
   retrieving Uniform Resource locators (URLs) of all the bookmarked Web pages in the created sub-folder, the created sub-folder being stored on the remote computer system and being enabled to be viewed by a plurality of users, however, only bookmarked Web pages in the created sub-folder for which a user has access permission may be accessed by the user;
   comparing the URLs of the bookmarked Web pages with URLs of the Web pages in the categories; and
   highlighting all the Web pages in the categories displayed on the Web page that have the same URLs with the bookmarked Web pages.

15. A computer implemented method of indicating Web pages on a server that have already been bookmarked on a local computer system comprising:
   using a keyword or a phrase to search Web pages bookmarked in two or more sub-folders;
   creating a sub-folder into which all Web pages searched that contain the keyword or phrase are to be stored;
   storing bookmarks to all the Web pages that contain the keyword or phrase into the created sub-folder
   accessing a Web site on the server on which Web pages arranged in categories are displayed;
   retrieving Uniform Resource locators (URLs) of all the bookmarked Web pages in the created sub-folder, the created sub-folder being stored on the local computer system;
   comparing the URLs of the bookmarked Web pages with URLs of the Web pages in the categories; and
   highlighting all the Web pages in the categories displayed on the Web site that have the same URLs with the bookmarked Web pages.

* * * * *